United States Patent [19]

Schneider et al.

[11] Patent Number: 4,614,886
[45] Date of Patent: Sep. 30, 1986

[54] ELECTRIC DRIVE UNIT ESPECIALLY FOR WINDSHIELD WIPERS OF A MOTOR VEHICLE

[75] Inventors: Theodor Schneider, Freudental/Wurtt.; Karl-Friedrich Schubert, Bietigheim-Bissingen, both of Fed. Rep. of Germany

[73] Assignee: ITT Industries, Inc., New York, N.Y.

[21] Appl. No.: 491,596

[22] Filed: May 4, 1983

[30] Foreign Application Priority Data

May 28, 1982 [DE] Fed. Rep. of Germany ....... 3220191

[51] Int. Cl.[4] .............................................. H02K 7/06
[52] U.S. Cl. ....................................... 310/83; 310/89; 310/239; 310/71
[58] Field of Search ...................... 310/83, 89, 91, 238, 310/239, 246, 71, 43; 318/443; 15/250.3

[56] References Cited

U.S. PATENT DOCUMENTS

| | | | |
|---|---|---|---|
| 3,132,366 | 5/1964 | Brooks | 310/239 X |
| 4,227,104 | 10/1980 | Hamman | 310/83 X |
| 4,398,135 | 8/1983 | Busch et al. | 310/239 X |
| 4,399,380 | 8/1983 | Hirano | 310/83 X |

FOREIGN PATENT DOCUMENTS

| | | | |
|---|---|---|---|
| 2360182 | 6/1975 | Fed. Rep. of Germany | 310/83 |
| 2707288 | 8/1978 | Fed. Rep. of Germany | . |
| 236821 | 12/1925 | United Kingdom | 310/83 |
| 1393705 | 5/1975 | United Kingdom | 310/83 |
| 2014371 | 8/1979 | United Kingdom | 310/83 |

*Primary Examiner*—Mark O. Budd
*Attorney, Agent, or Firm*—Donald J. Lenkszus

[57] ABSTRACT

A windshield wiper motor drive unit is described wherein a gear cover, connector receptacle and brush plate are integrally formed as a one piece plastic part.

16 Claims, 8 Drawing Figures

ELECTRIC DRIVE UNIT ESPECIALLY FOR WINDSHIELD WIPERS OF A MOTOR VEHICLE

BACKGROUND OF THE INVENTION

This invention pertains to an electric drive unit of the type provided for windshield wipers on a motor vehicle.

In an electric drive unit shown in German specification OS No. 27 07 288 the receptacle for the connecting contacts is formed as a plug housing fitted on the gearhead cover. In German specification OS No. 26 46 886 the connecting contacts are provided in a receptacle which is formed by the cover itself.

In prior drive units, a brush plate is formed of an electrically nonconducting material and is fastened to an end shield in a motor housing. The receptacle for the connectors and the cover of the gearhead, and the brush plate are separately produced and separately mounted on the gear housing.

It is an object of the present invention to provide an electric drive unit in which the production costs for the piece parts are reduced and their mounting is simplified.

SUMMARY OF THE INVENTION

In accordance with the invention, the brush plate of an electric drive unit forms an integral constructional unit with the cover and the receptacle. This constructional unit can be injection-moulded from plastic material in a single working step. A single injection-moulding machine can be used thereby eliminating the need for additional machinery and time for the production of the brush plate. On this constructional unit can be mounted the Connecting contacts, brush holders with brushes and contacts for a limit switch, if necessary, can be mounted on the constructional unit before this constructional unit is secured on the gear housing.

Further in accordance with the invention, the brush plate may be formed as a ring segment. Such a brush plate permits the constructional unit to be mounted after the shaft with the collector and the laminated core of the electric motor has been pushed through the end shield. An assembly sequence of this kind is especially suitable, if the gearing is a worm gearing.

Further in accordance with the invention, the end shield may be provided with a recess, open to its rim, through which the brush plate is connected with the cover and plug housing and which is closed by the constructional unit. With this arrangement, the constructional unit does not project beyond the circumference of the motor housing in the vicinity of the end shield and can be made relatively solid and stable.

Further in accordance with the invention, the end shield has a circumferential collar facing the motor housing which is continued in the area of a recess, by a collar formed on the brush plate. The brush plate may be arranged closer to the end shield than the rim of the collar. By positioning the collar end at the rim of the recess in the end shield outside the adjacent rim portion of the brush plate the latter can be easily brought to its proper level, so that the cover can be easily positioned perpendicular to the axial direction of the gearhead.

Further in accordance with the invention, the cover is provided with a bulge which covers the recess in the end shield. One wall of the bulge adjoins the collar portion of the brush plate and has a lateral wall which touches the end shield at the rim of the recess. The bulge also connects the brush plate with the cover. A gap may be provided between the lateral wall of the bulge and the brush plate, so that the wall does not directly rest on the brush plate. The brush plate is thereby more easily moved relative to the cover. To facilitate injection-moulding one portion of the border of the recess in the end shield extends perpendicularly towards the cover, and the outer surface of the lateral wall of the cover is flush with one end of the collar portion on the brush plate and a rim portion of the brush plate extending from the end of the collar portion. The rim portion preferably leads to the inner side of the cover.

If a plug housing is provided on the cover for the electric drive unit, the cover has a bulge in an elongation of the plug housing, so that the plug housing is only open towards the outside of the side of connection. The bulge in the cover makes it possible to mount the connecting contacts, including a limit switch, from the inner side of the plug housing.

The motor housing and gear housing may be fastened together by means of slides and by screws screwed into the slides through the end shield. So that the bulge in the cover does not impair screwing in of the screws it is of advantage to provide the bulge with a lateral wall which extends in the longitudinal direction of the motor housing and which descends gradually, preferably curved to the inside, to the level of the cover.

The bulge also covers the recess. Leads may extend within the bulge to connect the brushes on the brush plate with plugs of the plug housing.

A ground connection of the gear and motor housings is provided by a plug in the receptacle having a stud extending towards the gearhead and engaging a recess of the jacket of the gearhead.

BRIEF DESCRIPTION OF THE DRAWINGS

The invention may be better understood from a reading of the following detailed description in conjunction with the drawings in which.

DETAILED DESCRIPTION

Figure 1:
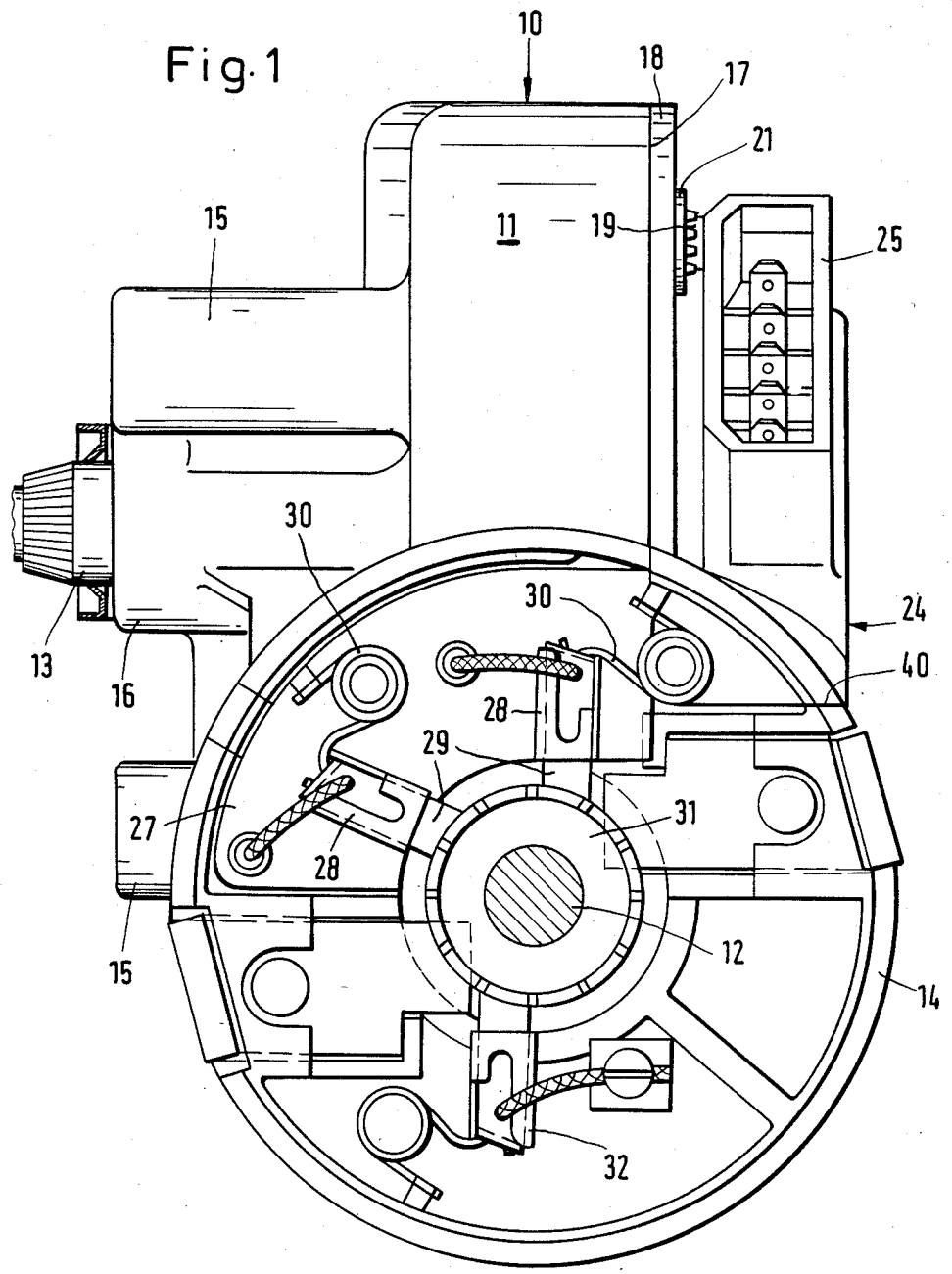
FIG. 1 illustrates a gear housing with cover, plug housing and brush plate mounted thereon as viewed in the direction of the end shield facing the motor housing.

The gear housing 10 shown in FIG. 1 has a gearhead 11. Gearhead 11 includes a worm gear developed as a step-down gear transforming the rotation of the motor shaft 12 into a slower rotation of the driven shaft 13. The axial direction of the gearhead 11 corresponds to the direction of the driven shaft 13. The end shield 14 is laterally fitted on the gearhead and closes one front face of the motor housing (not shown). The axial direction of the end shield 14 corresponds to the direction of the motor shaft 12 and extends perpendicular to the axial direction of the gearhead 11. Apart from a few fastening eyes 15 and a bearing stud 16, the gearhead 11 is substantially lower than the diameter of the end shield 14. Because the gearhead 11 is approximately centrally arranged with regard to the end shield 14 the latter protrudes considerably over the planar rim 17 at the open side of the gearhead 11. A cover 18, which rests flatly upon the rim 17, covers the gearhead 11. As most clearly shown in FIG. 7, the gearhead 11 includes pins 19 extending therefrom through bores 20 in the cover 18. The cover 18 is secured to the gearhead 11 by clamping rings 21 which are pushed over the protruding pins 19 to the cover 18. A plug housing 25 for the plugs 26 is integrally formed with the cover 18.

Turning back to FIG. 1, a brush plate 27 is also integrally formed with the cover 18. This brush plate is arranged on the side of the end shield 14 not facing the gearhead. Two brush holders 28 are secured on the brush plate. Each of these brush holders receives a carbon 29 which is pressed against the segments of the collector 31 which is pressed on the motor shaft 12. A third brush holder 32 is fixed directly on the shield 14. Cover 18 and brush plate 27 are connected through a recess 40, which is positioned in the segment of the end shield 14 lying above the rim 17 of the gearhead 11.

Figure 2:
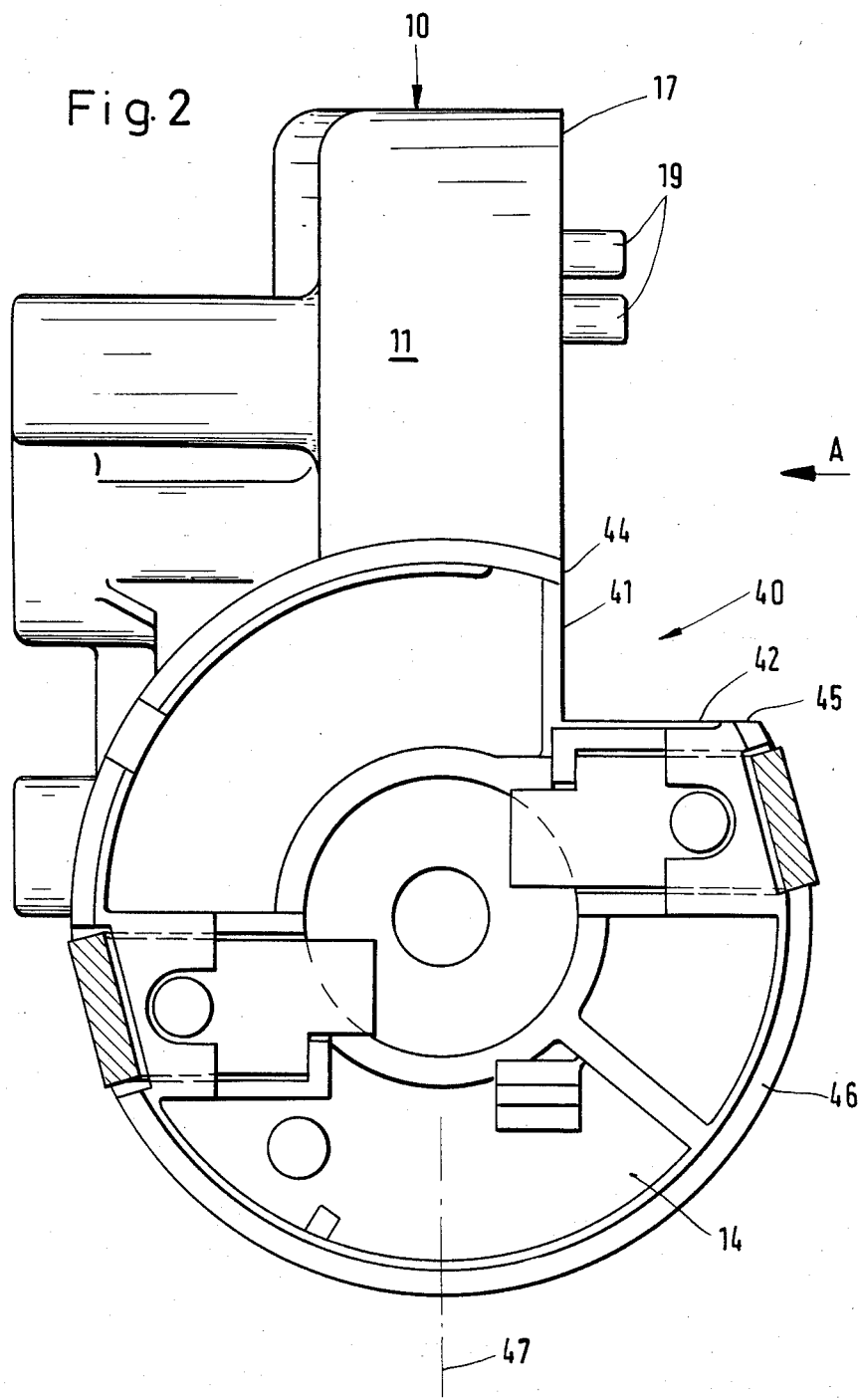
FIG. 2 is a view in accordance with FIG. 1 without the constructional unit consisting of cover, plug housing and brush plate.
Figure 3:
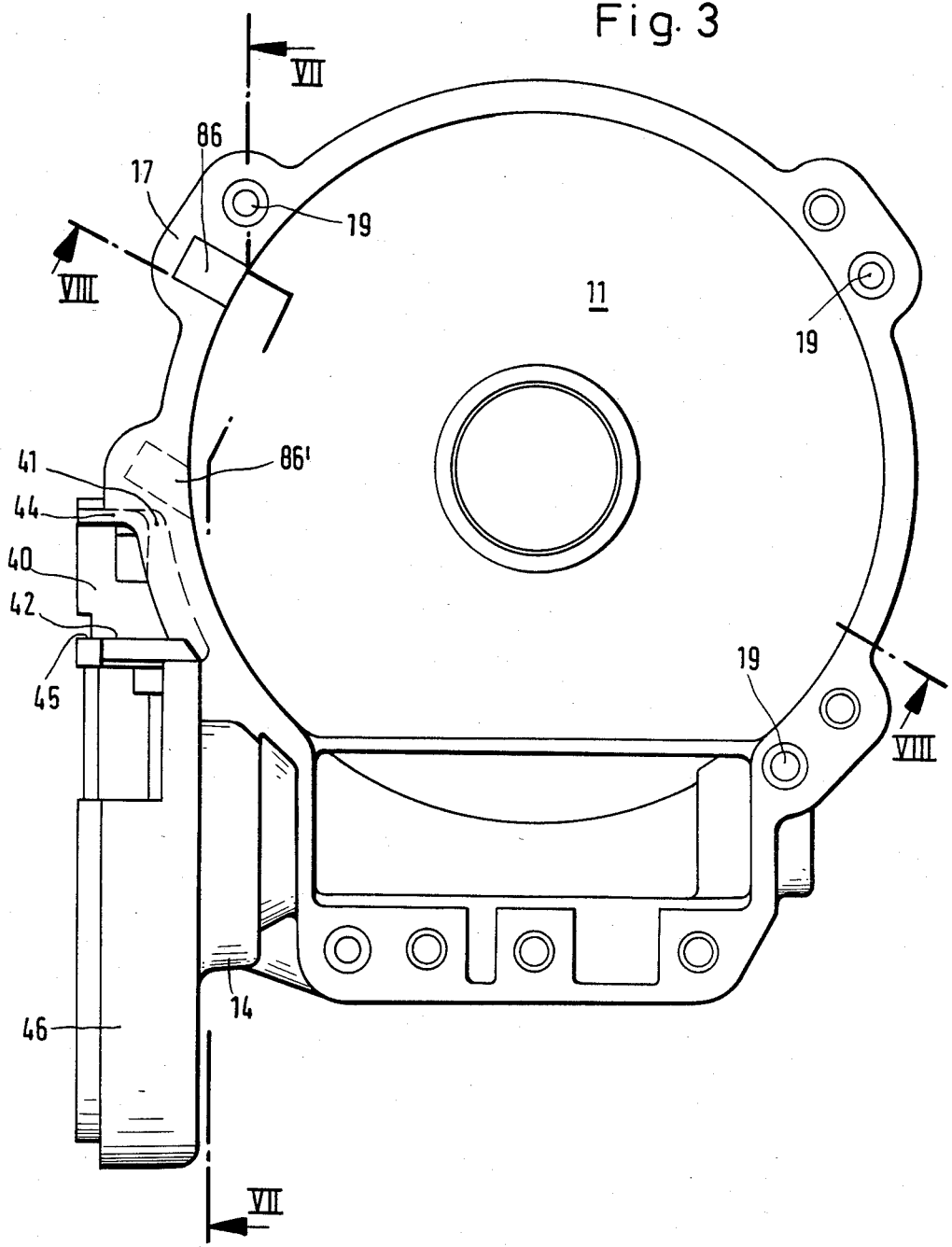
FIG. 3 illustrates the plug housing of FIG. 2 as seen in the direction of arrow A on FIG. 2.

The shape and position of recess 40 in the end shield 14 can be more clearly seen in FIGS. 2 and 3, which only show the gearhead 11 and the end shield 14 without the constructional part 24 consisting of cover 18, plug housing 25 and brush plate 27. The recess 40 has been formed in that an approximately triangular piece has been cut from that segment of the end shield 14 positioned above the rim of the gearhead on the side not facing it, where the end shield 14 and the gearhead 11 are closest to each other. The border of the open-edged recess consists of two portions 41 and 42 which form an angle of 90 degrees. The portion 41 is flush with the rim 17 of the gearhead 11, whereas the portion 42 extends in the axial direction of the gearhead 11. With this arrangement, the two ends 44 and 45 of a collar 46 formed on the end shield 14 are positioned such that the end 45 is much more remote than the end 44 from a plane 47, which extends perpendicular to the axial direction of the gearhead 11 and through the axis of the end shield 14 and which has been shown by a dash-dotted line in FIG. 2.

Figure 4:
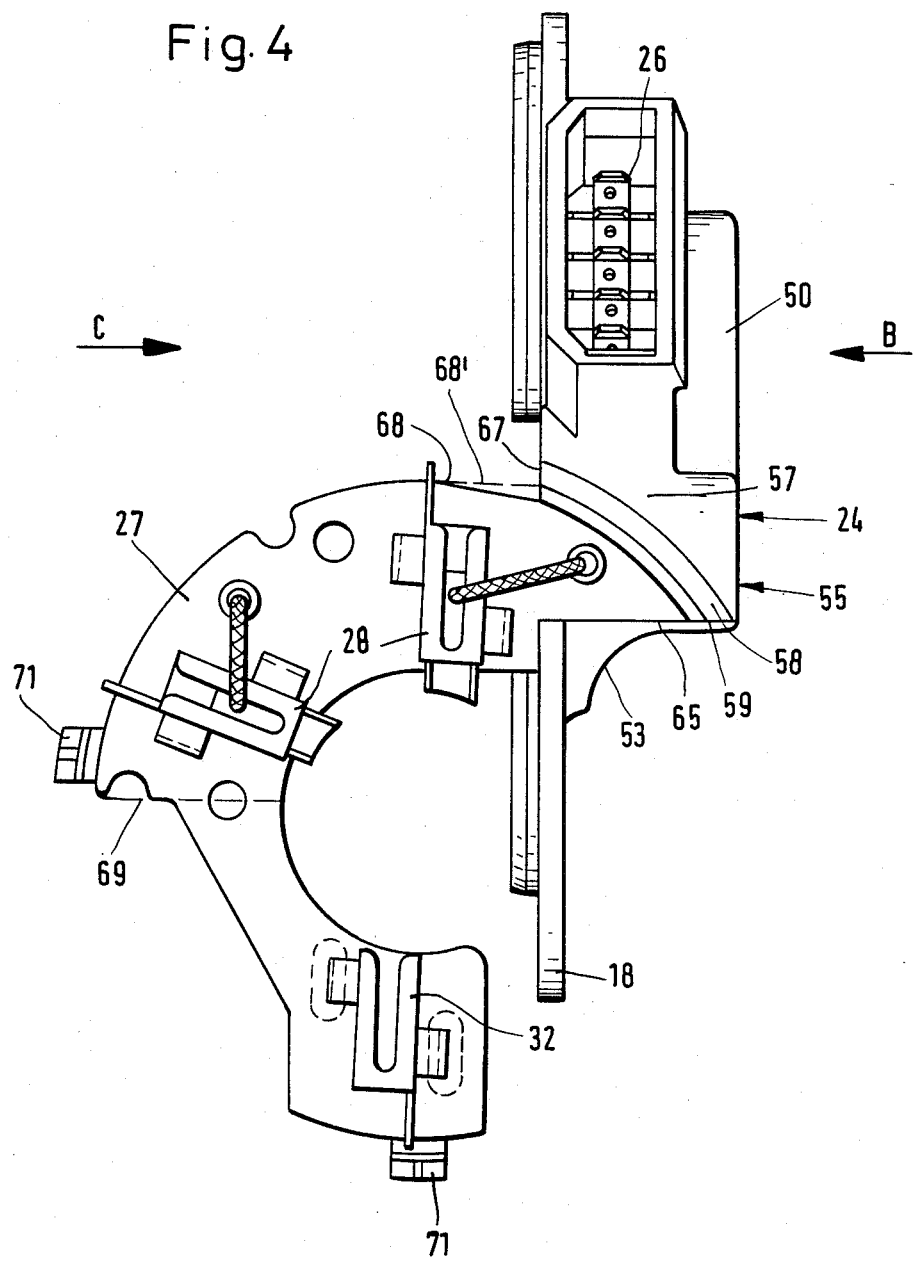
FIG. 4 shows a constructional unit which does not include the gear housing.
Figure 5:
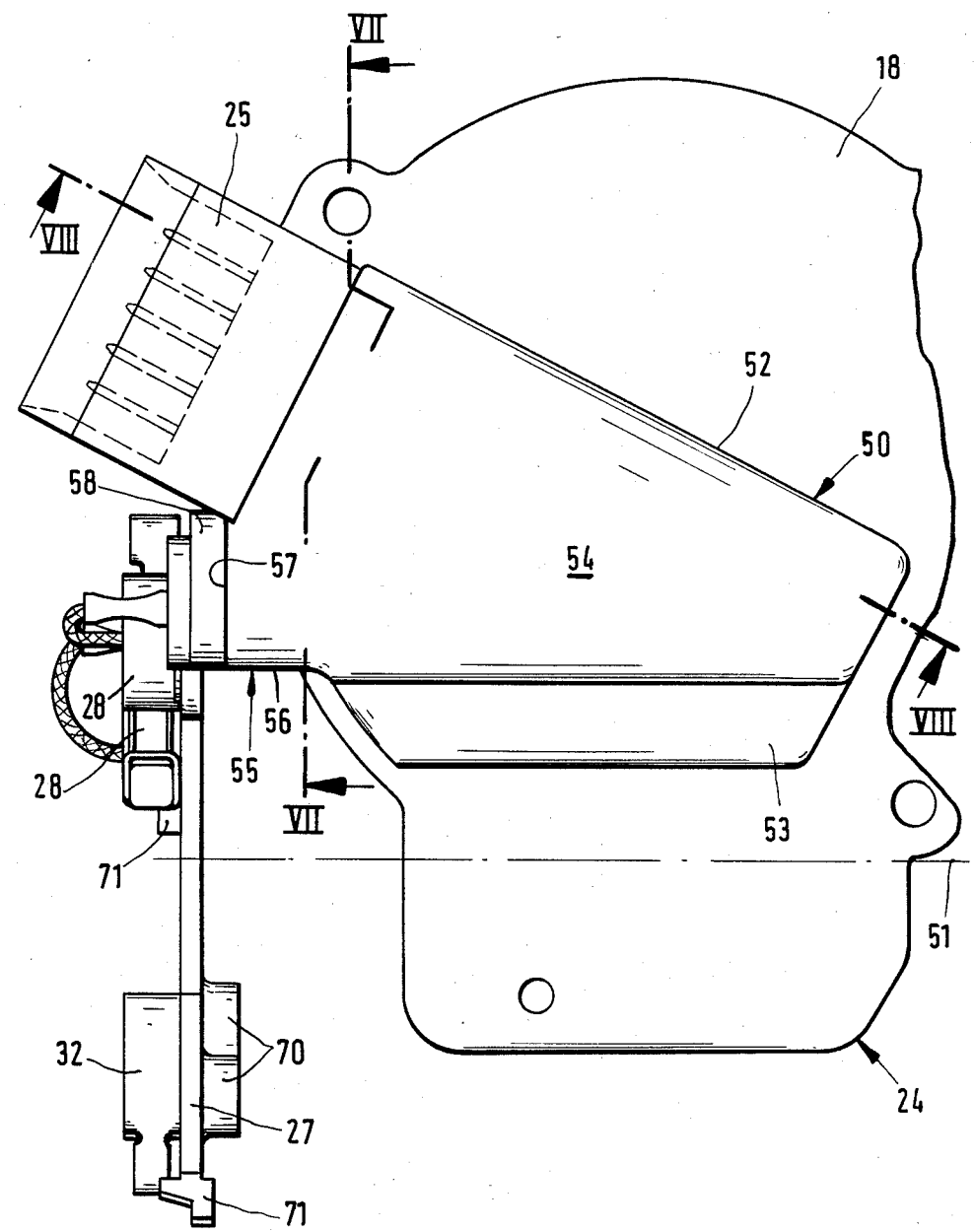
FIG. 5 shows the constructional unit of FIG. 4 in the direction of arrow B in FIG. 4.
Figure 6:
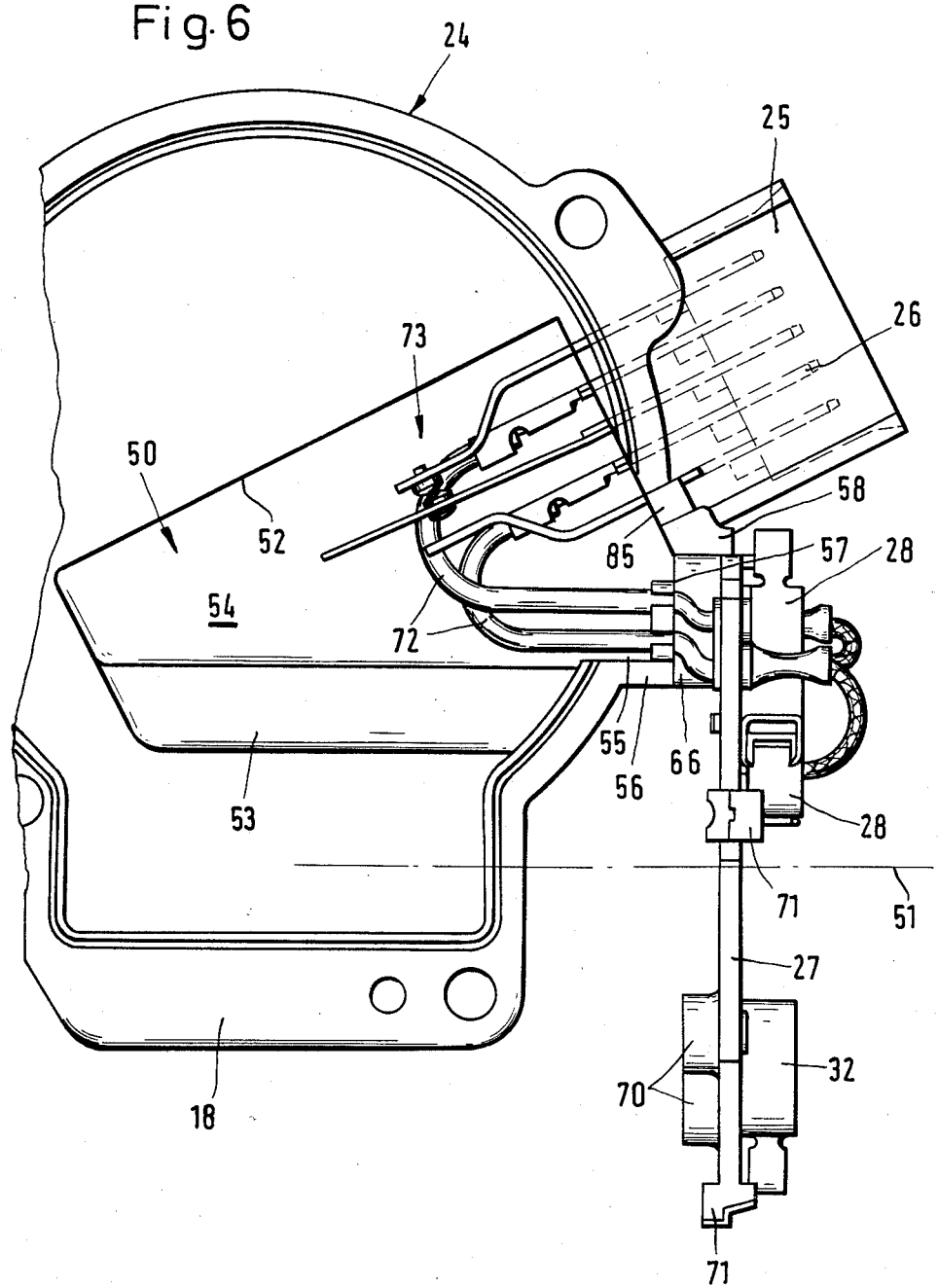
FIG. 6 shows the constructional unit of FIG. 4 in the direction of arrow C in FIG. 4.

FIGS. 4 to 6 show a constructional part 24 which differs only slightly from that of FIG. 1. Therefore both embodiments can be described in detail by way of FIGS. 4 to 6.

The plug housing 25 integrally formed on cover 18 extends into an elongated bulge 50 which on one side is limited by a wall 52 extending in the longitudinal direction of the plug housing 25 and diagonally to the axis 51 of the motor housing and limited on the other side by a wall 53 which extends towards the axis 51 and descends gradually, curved to the inside, to the level of the cover 18. On the side of the end shield 14 facing the plug housing 25, the bulge of the cover 18 changes into a cover 55. Cover 55 has a lateral wall 56 not facing the plug housing 25 in the mounted condition. The outer surface of wall 56 is flush with the portion 42 of the borer of recess 40 in the end shield 14. The bulge 55 is connected to a collar portion 58 via a wall standing perpendicularly on the cover 54. The collar portion 56 corresponds to the collar portion missing in the end shield because of the recess 40.

A brush plate 27 is fitted inside the collar portion 58 and extends below the jacket of the gearhead over a short distance. From the end 59 of the collar portion 58, which corresponds to the end 45 of the collar 46, a rim portion 65 of the brush plate 27 extends to the underside of the cover 18 thereby being perpendicular to the cover 18 and running in the axial direction of the gearhead 11. The outer surface of the wall 56, the end 59 of the collar portion 58 and the rim portion 65 are flush. Thus the rim portion 65 lies within the recess 40, so that mounting is facilitated. As is shown especially in FIG. 6 a further contribution hereto is that the wall 56 of the bulge 55 does not extend to the brush plate 27, but that there is a gap between the latter and the wall. Moreover the other end 67 of the collar portion 58 is followed by a first linearly extending rim portion 68 of the brush plate. This rim portion begins at the inner side of the collar 58 and extends diagonally to the axial direction of the gearhead 11 and to the outside as far as the outer rim of the brush plate 27.

The dashed lines in FIG. 4 illustrate the rim portion 68' of a constructional part of FIG. 1 which is slightly modified. Like the rim portion 65 this modified rim portion 68' stands perpendicularly on the cover 18 and hits against the end 67 of the collar portion 58.

On the side of the brush plate 27 not facing the end shield brush holders 28 are mounted. However, the brush plate 27 is elongated beyond the end of the brush plate 27 of FIG. 1 indicated by the broken line 69, so that the brush holder 32 can be secured on it. The brush holder 32 has feet which are inserted in the recesses in studs 70 of the brush plate 27, so that a firm hold of the brush holder 32 on the brush plate 27 is provided. Alternatively, the brush holders may be provided with bent feet 5 for fastening. Viewing constructional part 24 in a direction according to FIG. 1, the brush plate 27 is open in its front area. This makes it possible to mount the constructional part 24 after the motor shaft 12 has been inserted through the end shield. However, for an embodiment where the motor shaft 12 is inserted after the constructional part 24 has been mounted, the brush plate 27 can have the shape of a closed ring.

The brush plate 27, when mounted, is clamped between the end shield 14 and the motor housing by the studs 71, so that it is firmly held.

As can be seen in FIG. 6, the brushes can be connected in an electrically conductive manner with the corresponding plugs 26 within the constructional unit 24 before being mounted. In the embodiments, this has been done with the two carbons in the brush holders 28. In the example of FIGS. 4 to 6 cables are used for this purpose.

A limit switch 73 which is actuated by a gear member is provided by two stationary contacts and one changeover contact, which are formed in one piece on a plug 26.

Figure 7:
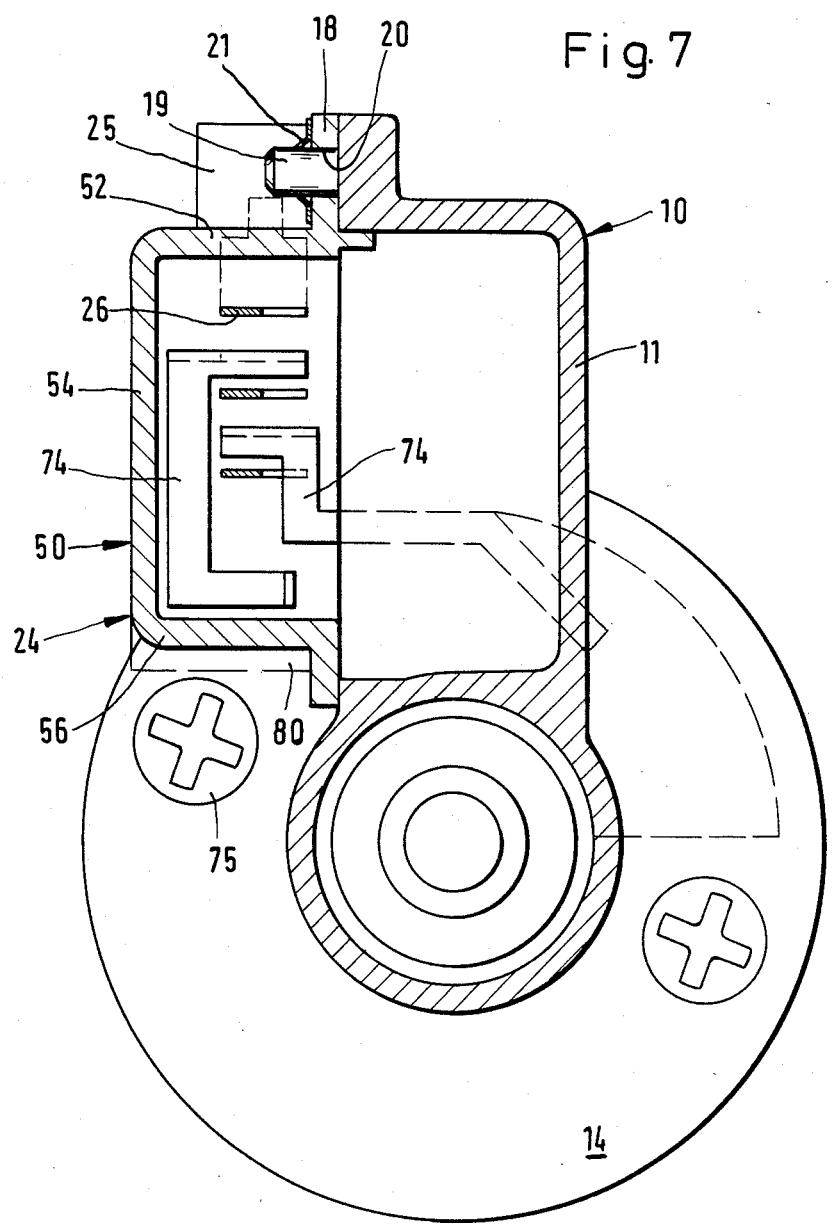
FIG. 7 is a sectional view through a gear housing taken on the lines VII—VII of FIGS. 3 and 5.

FIG. 7 illustrates an embodiment modified over that shown in FIG. 1. In this case, the carbons are connected with the corresponding plugs 26 via metallic conductors 74 secured in the constructional part 24. Thus it is not necessary to connect electric cables to the two assigned plugs 26.

FIG. 7 shows clearly that the wall 56 does not impair tightening of the screw 75. Because wall 53 of the bulge 50 descends to the level of the cover 18 in a curved manner, it cannot impair the mounting either.

As is indicated by broken lines on the wall 56, a spring 80 can be formed towards the outside, which spring rests upon the end shield 14 and thus effects an additional sealing of the recess 40 in the end shield 14 and provides an additional hold for the constructional part 24.

Figure 8:
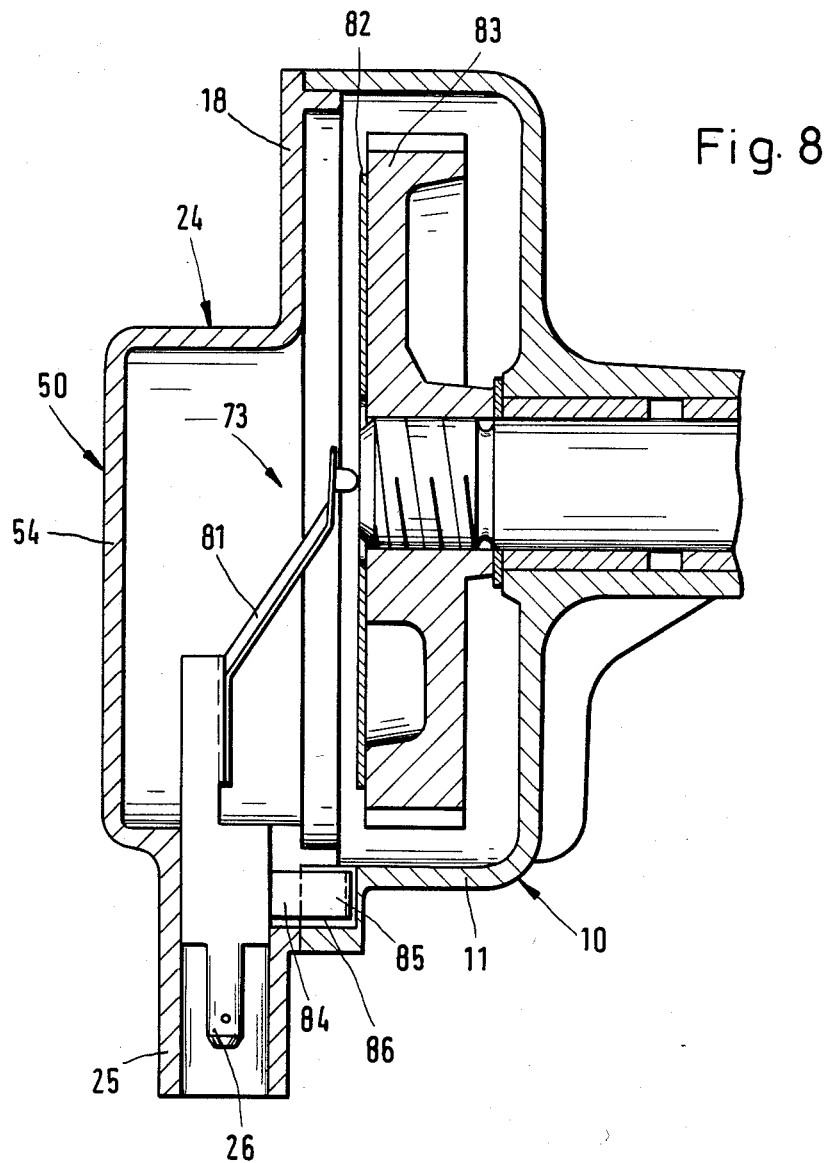
FIG. 8 is a sectional view taken on the lines VIII—VIII of FIGS. 3 and 5.

In the cross-section drawing of FIG. 8, it can be seen that a limit switch 73 may be provided by sliding springs 81 formed in one piece on the corresponding plugs 26 and a sliding path 82 on a gear wheel 83.

Above the jacket of the gearhead 11 the plug 26 shown in FIG. 8 has a stud 84 directed towards the gearhead. The end of stud 84 is bent to form a resilient loop 85. The loop 85 is pressed into a recess 86 in the jacket of the gearhead 11, which recess may be seen in FIG. 3, so that an electrically conductive connection between the gear housing 10 and the plug 26 is connectable to electrical ground. The recess 86 is closed towards the outside. As can be seen from FIG. 1, the shunt of the carbon positioned in the brush holder 32 is attached on the end shield 14. Thus, the carbon is connected in an electrically conductive manner with the plug 26 shown in FIG. 8 via the gear housing 10.

The plug 26, which is connectable to electrical ground, can of course also be arranged in another place, as shown in the embodiment according to FIG. 6. In this case the loop 85 is provided on that plug 26 which is positioned closest to the brush plate 27. Accordingly the recess 86 in the gearhead 11 is provided in another place. This recess, designated 86', has been indicated by broken lines in FIG. 3.

What is claimed is:

1. An electric drive unit for use with a windshield wiper assembly comprising:
   an electric motor having a motor shaft and a motor housing;
   a gear housing;
   a gearhead in said gear housing, said gearhead having an axial direction substantially perpendicular to the axial direction of said motor shaft and having an open side;
   an end shield closing one front face of said motor housing;
   a brush plate within said motor housing and adjacent said end shield;
   a constructional part comprising:
   a cover closing said gearhead open side, and a receptacle on said cover for connecting contacts;
   said brush plate, said cover and said receptacle being integrally formed in one piece of plastic material; and
   said end shield includes a recess which is open in a direction towards the rim of said end shield, said brush plate being connected to said cover and receptacle through said recess and said constructional part closing said recess, said recess opens in the direction of said constructional part, said recess is located in front of said open side of said gearhead and said recess has one border which extends to the rim of said end shield and is substantially flush with the open side of said gearhead, and said recess has a second border substantially perpendicular to said one border, said second border extending in said axial direction at said gearhead.

2. An electric drive unit in accordance with claim 1, wherein said brush plate is formed as a ring segment.

3. An electric drive unit in accordance with claim 1, wherein said end shield comprises a circumferential collar, said collar ending on either side of said recess, said constructional part having a second collar portion in the area of said recess, said brush plate extending from said second collar portion.

4. An electric drive unit in accordance with claim 3, wherein one end of said collar portion is remote from a plane extending perpendicular to the axial direction of said gearhead and through the axis of said end shield, said brush plate comprises a rim portion, and said one end is positioned outside of said rim portion.

5. An electric drive unit in accordance with claim 4, wherein the other end of said collar portion dispensed relatively close to said plane, said rim portion extending to said other end.

6. An electric drive unit in accordance with claim 3, wherein said cover comprises a bulge adapted to cover said recess.

7. An electric drive unit in accordance with claim 6, wherein said end shield comprises a circumferential collar, said collar endings on either side of said recess, said constructional part having a second collar portion in the area of said recess, said brush plate extending from said second collar portion, said bulge having a first wall adjoining said second collar portion and having a lateral wall touching said end shield at the rim of said recess.

8. An electric drive unit in accordance with claim 7, comprising a gap between said lateral wall and said brush plate.

9. An electric drive unit in accordance with claim 7, wherein said lateral wall is adapted to engage said recess.

10. An electric drive unit in accordance with claim 9, wherein said recess has one rim portion extending perpendicularly towards said cover, said brush plate having a rim portion extending from one end of said second collar portion towards the inner side of said cover, the outer surface of said lateral wall being flush with one end of said second collar portion and said rim portion.

11. An electric drive unit in accordance with claim 1, wherein said cover has a bulge which is an elongation of said receptacle, said receptacle being open only away from said bulge.

12. An electric drive unit in accordance with claim 11, wherein said bulge has a third lateral wall extending in the longitudinal direction of said motor housing, said lateral wall desending gradually to the level of said cover.

13. An electric drive unit in accordance with claim 11, wherein said bulge extends over and covers said recess, said drive unit comprising brushes supported on said brush plate, said receptacle supporting electrical contacts, and said brushes and said contacts being electrically connected by leads extending through said bulge.

14. An electric drive unit in accordance with claim 13, wherein said leads are in the form of conductive strips integrally formed with said contacts.

15. An electric drive unit in accordance with claim 1, comprising electrical contacts supported in said receptacle, said gearhead comprises a recess adjacent said receptacle, and one of said electrical contacts having a stud portion extending toward said gearhead and received in said recess.

16. An electric drive unit in accordance with claim 1, comprising one or more brushes, a metallic brush holder supporting each of said brushes, each said brush being disposed on said brush plate and having one or more feet extending towards said brush plate, said brush plate having a recess for each of said feet and adapted to be engaged by the corresponding foot, each said recess being in a corresponding third portion of said brush plate.

* * * * *